United States Patent [19]

Smith et al.

[11] 4,006,262
[45] Feb. 1, 1977

[54] INSTANT PUDDING COMPOSITION AND PROCESS

[75] Inventors: Richard A. Smith; Thomas E. Haney, both of Dover, Del.

[73] Assignee: General Foods Corporation, White Plains, N.Y.

[22] Filed: Mar. 10, 1975

[21] Appl. No.: 557,200

[52] U.S. Cl. .............................. 426/573; 426/579
[51] Int. Cl.² ......................................... A23L 1/187
[58] Field of Search ........... 426/578, 579, 573, 574

[56] References Cited

UNITED STATES PATENTS

| | | | |
|---|---|---|---|
| 2,257,599 | 9/1941 | Frismuth | 426/579 |
| 2,607,692 | 8/1952 | Kennedy | 426/579 |
| 2,801,924 | 8/1957 | Clausi | 426/579 |
| 3,326,696 | 6/1967 | Decnop | 426/579 |

*Primary Examiner*—Jeanette M. Hunter
*Attorney, Agent, or Firm*—Thomas V. Sullivan; Bruno P. Struzzi

[57] ABSTRACT

An instant pudding composition containing alkali pyrophosphate, alkali orthophosphate, thickener and sugar. The composition is rendered suitable for fork mixing with milk by controlling the particle size of the orthophosphate and sugar within critical limits.

7 Claims, No Drawings

INSTANT PUDDING COMPOSITION AND PROCESS

U.S. Pat. No. 2,801,924 to Clausi, issued Aug. 6, 1957, discloses that instant puddings can be prepared by using an alkali pyrophosphate as a milk protein coagulant, an alkali orthophosphate as a coagulation accelerator and a pregelatinized starch as a stiffening agent. Such puddings with desired body and textusre can be prepared by the consumer in 5 to 10 minutes utilizing an electric mixer or egg beater. While instant puddings of the type described in the patent have attained wide commercial success, their preparation, while relatively easy, still usually requires certain common household or kitchen utensils, namely, an electric mixer or egg beater and a mixing bowl principally because of the size and number of servings to be prepared from the mix.

With the trend toward still more convenience in food preparation, a need has existed for less time-consuming "instant" puddings which possess cooked pudding characteristics. To a certain extent, more quickly prepared "instant" puddings have become available with the advent of single service canned puddings. However, these products require extensive plant processing and equipment. Moreover, these products also are sometimes regarded as lacking optimum quality because of flavor losses associated with canning, retorting and sterilizing.

It would be advantageous therefore if a dry instant pudding mix were available which might allow for simpler preparation such as hand stirring with a more common utensil such as a fork and further offer single service features. Although single service, dry instant pudding mixes have also been available, such mixes have lacked good dispersibility in liquids such as milk and have also demanded elaborate plant processing techniques such as agglomeration of the dry mixes.

We have now discovered that dry instant pudding mixes adapted for use with simple fork stir, single service recipes and comprising an alkali pyrophosphate and an alkali orthophosphate can be prepared if the orthophosphate ingredient and sugar ingredient, typically included in the mixes, are maintained at critical particle size ranges. We have further discovered that for chocolate flavored dry instant pudding mixes maintaining the particle size of a low fat cocoa ingredient at a critical range or employing as the cocoa ingredient a defatted cocoa improves dispersibility. It appears that by controlling the granulation or particle size of these several ingredients, solubilization of the mix is improved and smoothness and creaminess of the resulting pudding are enhanced. Moreover, even though the mixes are made up into puddings with a fork stir recipe utilizing a drinking glass, cup or the like as a mixing vessel, the puddings appear to set faster than conventional instant puddings prepared by traditional methods, that is, employing an electric mixer or egg beater.

The particle size range of the alkali orthophosphate, typically disodium orthophosphate, is such that at least 90% passes through a U.S. Screen No. 100 and the particle size range of the sugar, typically sucrose, is such that at least 85% passes through a U.S. Screen No. 70. With respect to the low fat (i.e., 10 to 12% fat) cocoa, this commercially available ingredient is granulated so that its particle size range is such that no more than 95% passes through a U.S. Screen No. 200.

The alkali pyrophosphates which may be employed to coagulate the milk protein and thereby provide the gel upon which the pudding of the present invention is based include those of sodium and potassium. Of these the tetraalkali pyrophosphate is the most preferred, especially the tetrasodium and the tetrapotassium pyrophosphate.

Alkali orthophosphates such as the mono-, di-, and trialkali orthophosphates which may be employed include those of sodium and potassium. Of the various orthophosphates, the mono- and dialkali orthophosphates are preferred. Of the mono- and dialkali orthophosphates, those of sodium and potassium are preferred and disodium orthophosphate is more particularly preferred.

It is preferred that a stiffening agent be employed along with the phosphates and the milk protein in the preparation of the type of pudding to which the invention is directed. Such stiffening agents include starch and starch derivatives, natural gums and modifications thereof, cellulose derivatives, and the like. Of the various stiffening agents, pregelatinized and/or modified starch is by far the most preferred. Any suitable pregelatinized edible starch may be employed such as the starches of potato, rice, wheat, corn, waxy maize, sago, tapioca and the like. It is also possible, of course, to employ two or more of such starches in combination. Of the various pregelatinized starches that may be employed it is preferred to use a pregelatinized potato starch, corn starch, waxy maize starch or tapioca starch.

While the particle size of the pregelatinized starch does not appear to be critical, there are preferred particle sizes or ranges of particle size, there being a different optimum for different kinds of starch and for starches modified by different methods. For example, it has been found that with potato starch the bulk of the starch should be fine enough to pass through a U.S. Screen No. 140, whereas with tapioca starch, the bulk of the starch should be fine enough to pass through a U.S. Screen No. 270 mesh screen for best results.

The levels at which the phosphates and the pregelatinized starch may be employed with respect to each other and the amount of milk protein employed vary considerably but there are preferred ratios or levels at which they are best employed. In the case of the pyrophosphate coagulant, the amount of tetrasodium pyrophosphate which should be combined with a pint of milk in order to obtain a relatively quick setting pudding may range from about 1 gram to over 4 grams, the lower limit being determined by the time required for the pudding to set and the upper limit being determined by taste considerations. Similar considerations apply to the use of the coagulation accelerator which may be employed from about 0.5 gram to about 4.0 grams per pint of milk in the case of the disodium orthophosphate. The lower limit is determined by the rate of set. It has been found that the total amount of phosphates that should be combined with a pint of milk should not exceed about 5 grams because at this level the pudding may begin to acquire an objectionable taste.

In addition to sucrose, other sugars such as, for example, dextrose, may be employed along with various flavoring and coloring ingredients. Further, reduced calorie instant pudding mixes may be provided by replacing part of the sucrose with starch derivatives such as dextrins, which may be bulked, and with sweetening agents or sugar substitutes such as saccharin, Apartame or the like.

Spray-dried low melting point fats which result is improved texture, creaminess and smoothness may also be added as well as emulsifiers, defoaming agents and the like.

The process of preparing the pudding of the present invention is carried out in a very simple manner by admixing the phosphate-starch composition containing sugar, coloring and flavoring as desired with milk in a drinking glass, cup or the like. It is possible to use dried milk protein along with other ingredients of the dry composition and in such a case the desired pudding can be obtained simply by admixing the pudding ingredients with water. A sufficient degree of mixing is obtained by stirring with a fork.

In order to further illustrate the present invention, the following non-limiting examples are furnished.

EXAMPLE I

A dry mix is prepared by dry blending the following ingredients:

| Ingredients | Parts by Weight |
| --- | --- |
| Sucrose (85% min. through U.S.S. 70) | 56.5 |
| Dextrose, Hydrate | 24.3 |
| Pregelatinized Tapioca Starch, Modified | 14.1 |
| Disodium Orthophosphate (90% min. through U.S.S. 100) | 1.9 |
| Tetrasodium Pyrophosphate | 1.4 |
| Mono- and diglycerides | 0.5 |
| Salt | 0.5 |
| Hydrogenated Vegetable Oil with BHA added | 0.4 |
| Flavor | 0.3 |
| Color | 0.1 |
| | 100.0 |

An instant pudding is prepared by pouring ½ cup cold milk into an 8-ounce glass and adding 26.6 grams of the dry mix (the contents of a single service envelope) to the milk. The mixture is beaten vigorously with a fork until the mix is thoroughly dissolved — about 45 seconds. If desired, the pudding may be chilled. The pudding is ready-to-eat in five minutes.

EXAMPLE II

A dry mix is prepared by dry blending the following ingredients:

| Ingredients | Parts by Weight |
| --- | --- |
| Sucrose (85% min. through U.S.S. 70) | 58.6 |
| Dextrose, Hydrate | 15.0 |
| Pregelatinized Tapioca Starch, Modified | 13.3 |
| Cocoa (low fat; 95% max. through U.S.S. 200) | 6.6 |
| Disodium Orthophosphate (90% min. through U.S.S. 100) | 3.3 |
| Tetrasodium Pyrophosphate | 1.2 |
| Algin (Dariloid QH) | 0.8 |
| Mono- and diglycerides | 0.4 |
| Hydroxylated Lecithin | 0.2 |
| Salt | 0.2 |
| Hydrogenated Vegetable Oil with BHA added | 0.2 |
| Color | 0.1 |
| Flavor | 0.1 |
| | 100.0 |

An instant pudding is prepared by pouring ½ cup cold milk into an 8-ounce glass and adding 30.1 grams of the dry mix (the contents of a single service envelope) to the milk. The mixture is beaten vigorously with a fork until the mix is thoroughly dissolved — about 45 seconds. If desired, the pudding may be chilled. The pudding is ready-to-eat in five minutes.

Although the present invention has been described in conjunction with certain preferred embodiments, features and materials, ingredients and compounds, it is apparent that many suitable alternatives will be apparent to those skilled in the art. Accordingly, the invention is not to be restricted or limited except by the following appended claims.

What is claimed is:

1. In a composition for use in preparing an instant pudding by interaction with milk protein of an alkali pyrophosphate and an alkali orthophosphate, and containing a stiffening agent and a sugar as a sweetening agent, the improvement which comprises maintaining the particle size range of said orthophosphate such that at least 90% thereof passes through a U.S. Screen No. 100 and the particle size of said sugar such that at least 85% thereof passes through a U.S. Screen No. 70.

2. A composition as in claim 1 in which said orthophosphate is disodium orthophosphate and said sugar is sucrose.

3. A composition as in claim 2 further comprising cocoa and further comprising the improvement of said cocoa being a low fat cocoa, having a partial size range such that no more than 95% passes through a U.S. Screen No. 200.

4. A composition as in claim 2 further comprising cocoa and further comprising the improvement of said cocoa being a defatted cocoa.

5. A process for preparing an instant pudding comprising admixing the composition of claim 2 with milk with vigorous beating with a fork and allowing the admixture to set.

6. A process for preparing an instant pudding comprising admixing the composition of claim 3 with milk with vigorous beating with a fork and allowing the admixture to set.

7. A process for preparing an instant pudding comprising admixing the composition of claim 4 with milk with vigorous beating with a fork and allowing the admixture to set.

* * * * *